(12) United States Patent
Sun et al.

(10) Patent No.: US 12,386,140 B2
(45) Date of Patent: Aug. 12, 2025

(54) CASING AND LENS

(71) Applicant: AAC Optics (Nanning) Co., Ltd., Nanning (CN)

(72) Inventors: Yan Sun, Shenzhen (CN); Ming Gao, Shenzhen (CN); Renlong Yu, Shenzhen (CN)

(73) Assignee: AAC Optics (Nanning) Co., Ltd., Nanning (CN)

( * ) Notice: Subject to any disclaimer, the term of this patent is extended or adjusted under 35 U.S.C. 154(b) by 606 days.

(21) Appl. No.: 17/840,653

(22) Filed: Jun. 15, 2022

(65) Prior Publication Data
US 2023/0194826 A1 Jun. 22, 2023

(30) Foreign Application Priority Data

Dec. 22, 2021 (CN) .......................... 202123252429.4

(51) Int. Cl.
*G02B 7/02* (2021.01)
*H04N 23/51* (2023.01)
*H04N 23/55* (2023.01)

(52) U.S. Cl.
CPC ............. *G02B 7/022* (2013.01); *H04N 23/51* (2023.01); *H04N 23/55* (2023.01)

(58) Field of Classification Search
CPC .......... G02B 7/02; G02B 7/021; G02B 7/022; G02B 7/023; G02B 7/026; H04N 23/51; H04N 23/55
See application file for complete search history.

(56) References Cited

U.S. PATENT DOCUMENTS

| | | | | |
|---|---|---|---|---|
| 2006/0125925 A1* | 6/2006 | Lee | ......................... | H04N 23/55 348/208.12 |
| 2012/0019905 A1* | 1/2012 | Teraoka | ................. | G02B 7/021 359/356 |
| 2019/0137850 A1* | 5/2019 | Ha | ......................... | G02B 7/028 |
| 2022/0291473 A1* | 9/2022 | Tanaka | .................. | G02B 7/023 |

\* cited by examiner

*Primary Examiner* — Ephrem Z Mebrahtu
(74) *Attorney, Agent, or Firm* — Wiersch Law Group

(57) ABSTRACT

The present disclosure provides a casing and a lens and relates to the technical field of optical equipment. The casing includes an outer casing provided with an accommodating hole and an inner casing accommodated in the outer casing and provided with a mounting hole. The outer casing is made of metal material, and a hardness of the inner casing is lower than a hardness of the outer casing, thereby the outer casing can meet the metal shape requirements of the lens. The relatively soft inner casing can solve the problem that a metal material cannot be tightly fitted with the lens group. The casing not only has advantages of metal profiles, but also can take a fitting structure with stacked outer diameters and a bumpy ridge fitting structure into account due to providing the relatively soft inner casing inside, which is more beneficial for lenses with high performance requirements.

9 Claims, 5 Drawing Sheets

CASING AND LENS

TECHNICAL FIELD

The present disclosure relates to the technical field of optical equipment, in particular to a casing and a lens.

BACKGROUND

At present, the outdoor lenses of vehicles, sports cameras and the like on the market generally use plastic or metal casings. For relatively harsh environments, metal casings are generally used. However, the machining accuracy at outer diameter of a metal casing is about 10 μm, and the eccentricity is about 10 μm. During the machining process, the eccentricity fluctuates greatly, resulting that the size cannot be effectively controlled, which limits the cooperation of the metal casing and a precision lens, and when the lens and the metal casing are tightly fitted, the risk of failure of a sensitive lens is high. Moreover, the metal casing 1' can only match a fitting structure with stacked outer diameters 2' (as shown in FIG. 1), but cannot match a bumpy ridge fitting structure 3' (as shown in FIG. 2), which is not conducive to optimization of performance of the overall design of the lens, especially for the lens with higher precision requirements. In addition, the metal casing requires a high blackening accuracy, which lengthens the proofing phase cycle of products, makes a poor timeliness, and a poor controllability of mass production of the products. As for a plastic casing, although it can solve the problem of cooperation of the lens and the casing, it has poor load-carrying performance in terms of installability and reliability, and has a high risk of failure.

SUMMARY

The present disclosure aims to provide a casing and a lens, to solve the defects of metal and plastic casings of existing lenses.

A first technical solution according to the present disclosure includes:
a casing for mounting a lens group to form a lens, the casing includes:
an outer casing made of metal material, the outer casing is provided with an accommodating hole, the accommodating hole passes through the outer casing along an optical axis of the lens, and the outer casing forms a hole wall of the accommodating hole providing with a rough part; and
an inner casing, where a hardness of the inner casing is lower than the hardness of the outer casing, the inner casing is accommodated in the accommodating hole, and the inner casing is attached to the hole wall and engaged with the rough part, and the inner casing is provided with a mounting hole for mounting of the lens group, and the mounting hole passes through the inner casing along the optical axis.

As an improvement, the hole wall includes an engaging section and an opening section, the opening section is provided close to an object side of the lens, and the opening section is formed by fine machining, the inner casing is attached to the engaging section to expose the opening section in the accommodating hole, and the rough part is located on the engaging section.

As an improvement, the engaging section is roughened to form the rough part.

As an improvement, the engaging section includes a first concave-convex structure, and the inner casing includes a second concave-convex structure complementary to the first concave-convex structure.

As an improvement, the first concave-convex structure includes at least one first concave-convex part and at least one second concave-convex part, an extending direction of the at least one first concave-convex part and an extending direction of the at least one second concave-convex part form an angle, and the second concave-convex structure includes at least one third concave-convex part and at least one fourth concave-convex part, a number of the third concave-convex part is identical to a number of the first concave-convex part and the third concave-convex part corresponds to the first concave-convex part one-to-one, and a number of the fourth concave-convex part is identical to a number of the second concave-convex part and the fourth concave-convex part corresponds to the second concave-convex part one-to-one.

As an improvement, the accommodating hole is a stepped hole, to form, on the engaging section, a plurality of circumferential surfaces and steps located between adjacent circumferential surfaces, and the at least one first concave-convex part is formed on the plurality of circumferential surfaces and extends in a direction perpendicular to the optical axis, the at least one second concave-convex part is formed on the plurality of steps and extends in a direction parallel to the optical axis, and the inner casing includes a circumferential part and an end part, the at least one third concave-convex part is formed on the circumferential part, and the at least one fourth concave-convex portion is formed on the end part.

As an improvement, a fifth concave-convex part is provided on a side of the end part away from the at least one fourth concave-convex part.

As an improvement, an inner wall of the inner casing forming the mounting hole is in a form of a stepped surface.

As an improvement, the casing further includes a locking member, the locking member surrounds the outer casing, and the locking member is used for abutting with the lens group, to fix the lens group in the inner casing.

As an improvement, a material of the inner casing is plastic, and the inner casing is formed on the hole wall by injection molding.

A second technical solution according to the present disclosure lies in:
a lens, including a lens group and a casing as described above.

The technical solution according to the present disclosure can achieve the following beneficial effect: the casing as described above is applicable to a lens, the casing can take into account the metal shape requirements of the lens and the mounting requirements of the lens group, and can enable the lens to have excellent imaging performance. Specifically, the casing includes an outer casing provided with an accommodating hole and an inner casing accommodated in the outer casing and provided with a mounting hole. The outer casing is made of metal material, and a hardness of the inner casing is lower than a hardness of the outer casing, thereby the outer casing can meet the metal shape requirements of the lens. Furthermore, the relatively soft inner casing can meet the mounting requirements of the lens group, and solve the problem that a metal material cannot be tightly fitted with the lens group, so that the lens group can be tightly fitted with the casing, thus the poor performance caused by the cooperation of a sensitive lens and the casing can be improved, and the fit level can be controlled to less than 1

μm. In this way, it is easier to find the optimal cooperation mode, and the product performance is more stable. The casing as described above not only has advantages of metal profiles, but also can take a fitting structure with stacked outer diameters and a bumpy ridge fitting structure into account due to providing the relatively soft inner casing inside, which is more beneficial for lenses with high performance requirements. Further, the outer casing forms a hole wall of the accommodating hole providing with a rough part. The provided rough part can increase the engagement stability between the inner casing and the outer casing, and can reduce the machining accuracy requirements at the engagement part between the inner casing and the outer casing. In this way, the manufacturing cost can be reduced and the production efficiency can be improved.

DETAILED DESCRIPTION OF EMBODIMENTS

The present disclosure will be further described below with reference to the accompanying drawings and embodiments.

Obviously, the described embodiments are only a part of embodiments of the present disclosure, but not all of the embodiments. Based on the embodiments of the present disclosure, other embodiments which can be obtained by those skilled in the art without any inventive work shall fall within the protection scope of the present disclosure.

It should be noted that similar numerals and letters represent similar items in the following drawings. Thus, once an item is defined in a drawing, no further definition and explanation is needed in subsequent drawings.

In the description of the present disclosure, it should be noted that, the orientation or positional relationships indicated by the terms "upper", "lower", "inner", "outer" or the like refer to those as shown in the accompanying drawings, or those as shown when the product according to the present disclosure is conventionally placed in use, which are only for the convenience of describing the product according to the present disclosure and simplifying the description, rather than indicating or implying that the device or element referred to must have a specific orientation or be constructed and operated in a specific orientation, and therefore should not be construed as a limitation to the present disclosure.

In addition, the terms "first", "second" and the like are only used for distinguishing description, and should not be construed as indicating or implying relative importance.

It should be noted that the features in the embodiments of the present disclosure can be combined with each other as long as there is no conflict.

Figure 1:
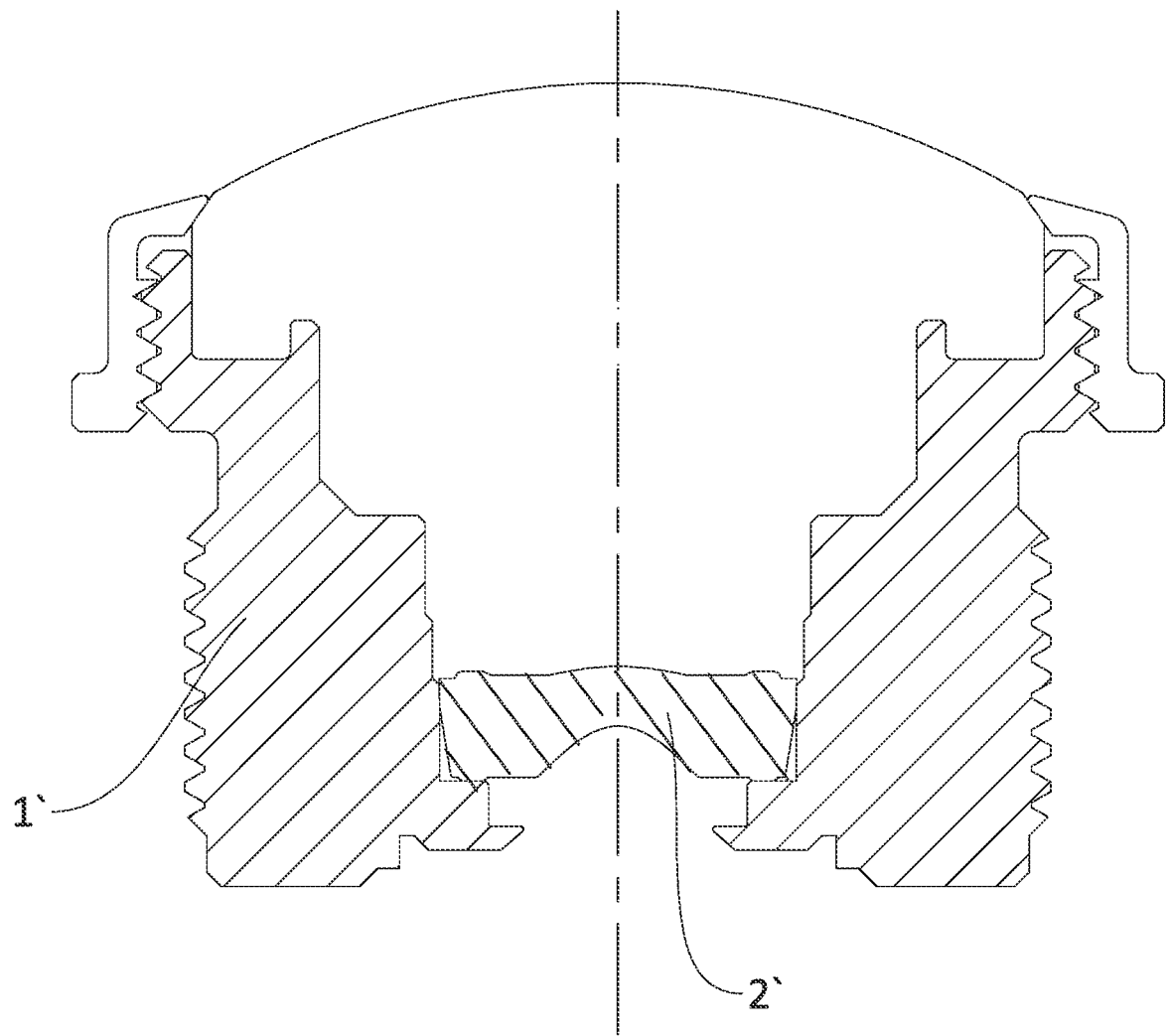
FIG. 1 is a schematic diagram of mounting of a casing and a fitting structure with stacked outer diameters in the related art.
Figure 2:
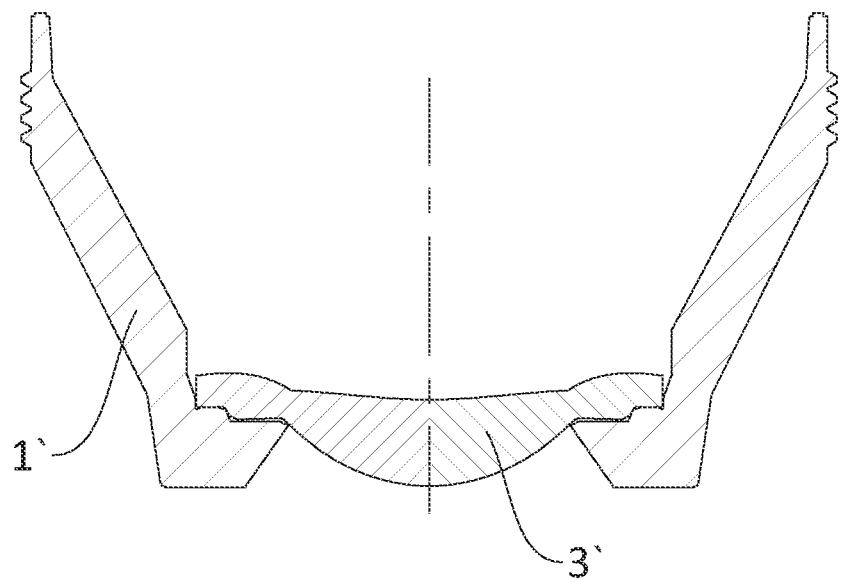
FIG. 2 is a schematic diagram of mounting of a casing and a bumpy ridge fitting structure in the related art.

At present, the outdoor lenses of vehicles, sports cameras and the like on the market generally use plastic or metal casings. For relatively harsh environments, metal casings are generally used. However, the machining accuracy at outer diameter of a metal casing is about 10 μm, and the eccentricity is about 10 μm. During the machining process, the eccentricity fluctuates greatly, resulting that the size cannot be effectively controlled, which limits the cooperation of the metal casing and a precision lens, and when the lens and the metal casing are tightly fitted, the risk of failure of a sensitive lens is high. Moreover, the metal casing 1' can only match a fitting structure with stacked outer diameters 2' (as shown in FIG. 1), but cannot match a bumpy ridge fitting structure 3' (as shown in FIG. 2), which is not conducive to optimization of performance of the overall design of the lens, especially for the lens with higher precision requirements. In addition, the metal casing requires a high blackening accuracy, which lengthens the proofing phase cycle of products, makes a poor timeliness, and a poor controllability of mass production of the products. As for a plastic casing, although it can solve the problem of cooperation of the lens and the casing, it has poor load-carrying performance in terms of installability and reliability, and has a high risk of failure.

Figure 3:
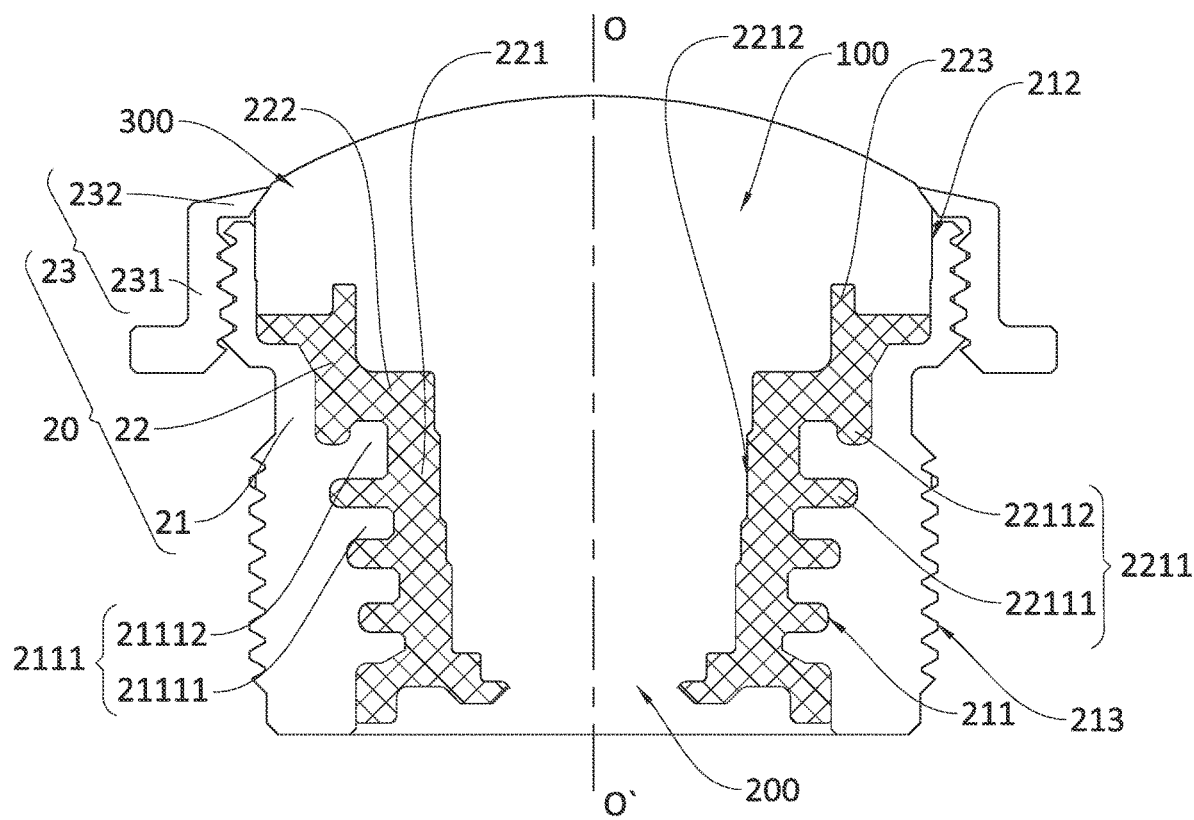
FIG. 3 is a schematic diagram of a casing according to the present disclosure.
Figure 4:
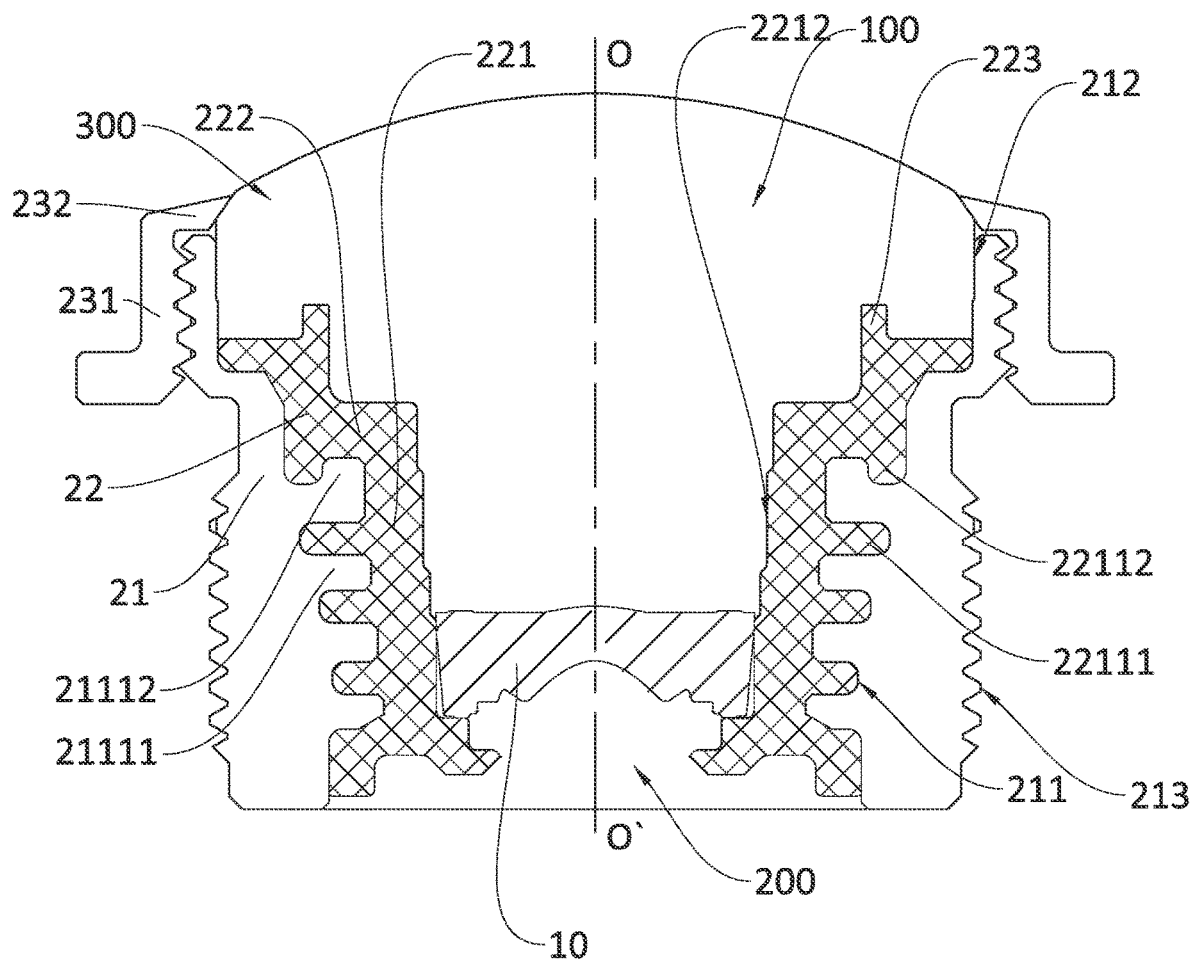
FIG. 4 is a schematic diagram of mounting of a casing according to the present disclosure and a fitting structure with stacked outer diameters.
Figure 5:
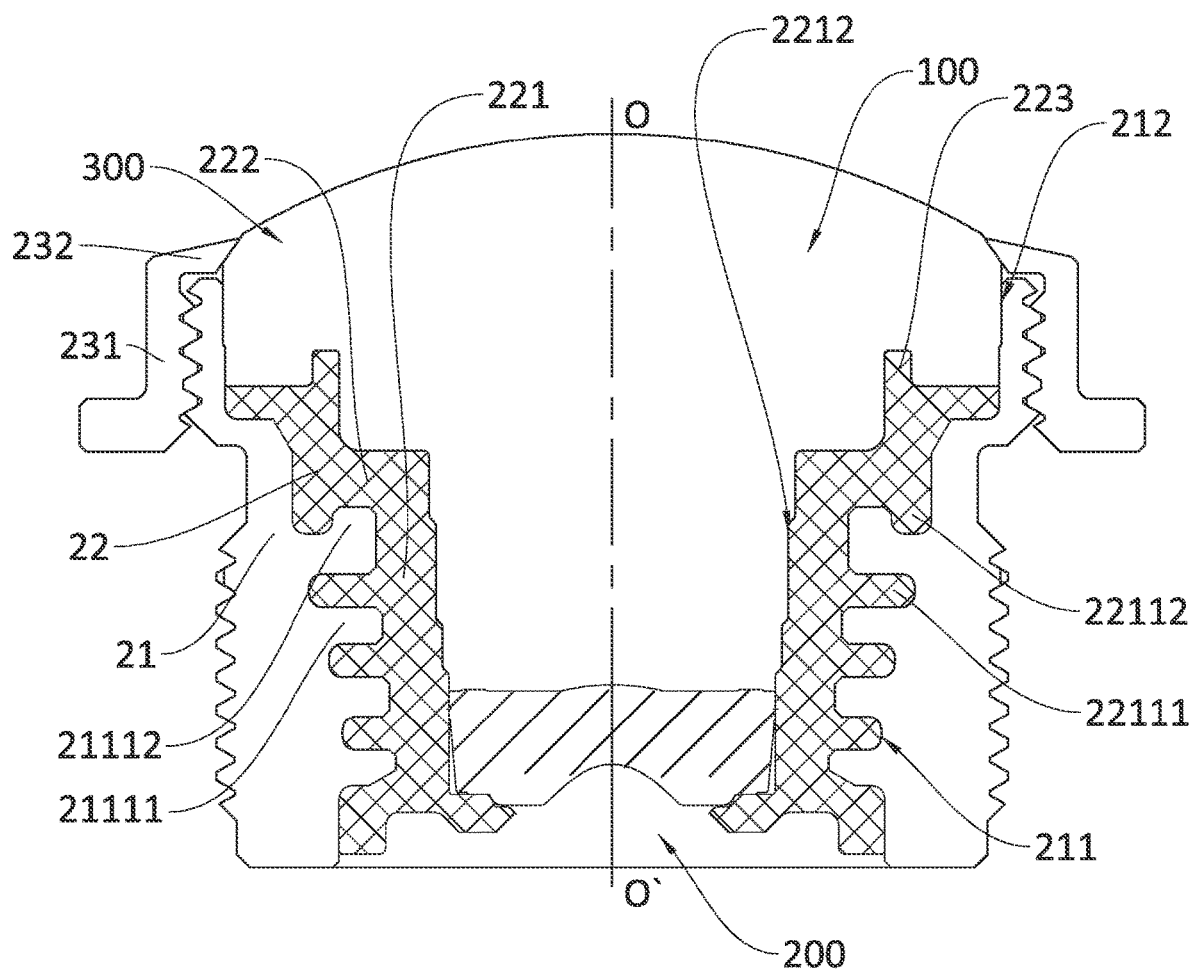
FIG. 5 is a schematic diagram of mounting of the casing according to the present disclosure and a bumpy ridge fitting structure.

For the purpose of solving the above technical problem, the present disclosure provides a lens which is an outdoor lenses applicable to vehicles or sports cameras. Reference is made to FIGS. 3 to 5, the lens includes a lens group 10 and a casing 20. The casing is used for mounting the lens group 10 to form the lens. Specifically, the casing 20 includes an outer casing 21 and an inner casing 22. The outer casing 21 is made of metal material. The outer casing 21 is provided with an accommodating hole 100. The accommodating hole 100 passes through the outer casing 21 along an optical axis OO' of the lens. The outer casing 21 forms a hole wall of the accommodating hole 100 providing with a rough part. A hardness of the inner casing 22 is lower than a hardness of the outer casing 21. The inner casing 22 is accommodated in the accommodating hole 100. The inner casing 22 is attached to the hole wall and engaged with the rough part. The inner casing 22 is provided with a mounting hole 200 for mounting of the lens group 10. The mounting hole 200 passes through the inner casing 22 along the optical axis OO'.

In summary, when implementing the embodiments of the present disclosure, the following beneficial effect can be achieved: the casing 20 as described above is applicable to a lens, the casing can take into account the metal shape requirements of the lens and the mounting requirements of the lens group 10, and can enable the lens to have excellent imaging performance. Specifically, the casing 20 includes an outer casing 21 provided with an accommodating hole 100 and an inner casing 22 accommodated in the outer casing 21 and provided with a mounting hole 100. The outer casing 21 is made of metal material, and a hardness of the inner casing 22 is lower than a hardness of the outer casing 21, thereby the outer casing 21 can meet the metal shape requirements of the lens. Furthermore, the relatively soft inner casing 22 can meet the mounting requirements of the lens group 10, and solve the problem that a metal material cannot be tightly fitted with the lens group 10, so that the lens group 10 can be tightly fitted with the casing 20, thus the poor performance caused by the cooperation of a sensitive lens and the casing can be improved, and the fit level can be controlled to less than 1 μm. In this way, it is easier to find the optimal cooperation mode, and the product performance is more stable. The casing 20 as described above not only has advantages of metal profiles, but also can take a fitting structure with stacked outer diameters (as shown in FIG. 4)

and a bumpy ridge fitting structure (as shown in FIG. 5) into account due to providing the relatively soft inner casing 22 inside, which is more beneficial for lenses with high performance requirements. Further, the outer casing 21 forms a hole wall of the accommodating hole 100 providing with a rough part. The provided rough part can increase the engagement stability between the inner casing 22 and the outer casing 21, and can reduce the machining accuracy requirements at the engagement part between the inner casing 22 and the outer casing 21. In this way, the manufacturing cost can be reduced and the production efficiency can be improved.

As an improvement, reference is made to FIGS. 3 to 5, the hole wall includes an engaging section 211 and an opening section 212. The opening section 212 is provided close to an object side of the lens. The opening section 212 is formed by fine machining, and the inner casing 22 is attached to the engaging section 211 to expose the opening section 212 in the accommodating hole 100, and the rough part is located on the engaging section. The opening section 212 is applicable to cooperate and engage with the lens group 10 due to the opening section is directly exposed in the accommodating hole 100. Thus, the opening section 212 formed by fine machining can improve the fitting accuracy of the opening section 212 and the lens group 10, thereby improving imaging accuracy of the lens. Furthermore, providing the opening section 212 further provides a positioning function which can facilitate the positioning and mounting of the inner casing 22 and the outer casing 21. In this embodiment, a material of the inner casing 22 is plastic, and the inner casing is formed on the hole wall by injection molding. A profile and a dimension of the outer casing 21 are obtained by machining, and the above-mentioned opening section 212 formed by fine machining can also be used for injection positioning. The engaging section 211 needs no fine machining, and the surface of the engaging section is roughened to form a rough part. Then, the appearance surface of the outer casing 21 is treated to be blackened by oxidation, thereby the requirements for processing and blackening of the casing 20 can be greatly reduced, and the manufacturing cost can be greatly reduced. Finally, the inner casing 22 is molded in the accommodating hole 100 by injection molding. Further, the inner casing 22 is attached to the engaging section 211, so that the inner casing 22 is located between the lens group 10 and the engaging section 211, thereby a direct contact of the lens group 10 and the engaging section 211 can be avoid. In this way, no fine machining is needed for the engaging section 211 to improve the fitting accuracy of the engaging section and the lens group 10, thereby manufacturing costs can be reduced and production efficiency can be improved. Further, the rough part is located on the engaging section 211 to improve the engagement stability of the inner casing 22 and the engaging section 211. In this embodiment, the engaging section 211 is roughened to form the rough part. The rough part may be distributed throughout the entire engaging section 211 or distributed on a part of the engaging section 211 in a continuous or discontinuous manner. Moreover, in addition to being formed on the hole wall by rough treatment, such as shot blasting or the like, the engaging section 211 may also be integrally formed during the manufacturing process of the outer casing 21.

As an improvement, reference is made to FIGS. 3 to 5, the engaging section 211 includes a first concave-convex structure 2111, and the inner casing 22 includes a second concave-convex structure 2211 complementary to the first concave-convex structure 2111. In this way, the first concave-convex structure 2111 and the second concave-convex structure 2211 can form, by their cooperation, a staggered fitting structure, which can further improve the engagement stability of the inner casing 22 and the outer casing 21, and prevent the inner casing 22 from falling off due to being subject to an environment of high or low temperature. As an improvement, the rough part may be formed on the first concave-convex structure 2111. Furthermore, the first concave-convex structure 2111 and the second concave-convex structure 2211 are complementary to each other, in this way, the engagement area between the first concave-convex structure 2111 and the second concave-convex structure 2211 can be increased, so that the engagement stability of the inner casing 22 and the outer casing 21 can be further improved.

As an improvement, reference is made to FIGS. 3 to 5, the first concave-convex structure 2111 includes at least one first concave-convex part 21111 and at least one second concave-convex part 21112. An extending direction of the at least one first concave-convex part 21111 and an extending direction of the at least one second concave-convex part 21112 form an angle. The second concave-convex structure 2211 includes at least one third concave-convex part 22111 and at least one fourth concave-convex part 22112, a number of the third concave-convex part 22111 is identical to a number of the first concave-convex part 21111 and the third concave-convex part corresponds to the first concave-convex part 21111 one-to-one, and a number of the fourth concave-convex part 22112 is identical to a number of the second concave-convex part 21112 and the fourth concave-convex part corresponds to the second concave-convex part 21112 one-to-one. Since the extending direction of the at least one first concave-convex part 21111 and the extending direction of the at least one second concave-convex part 21112 form an angle, fitting structures of the at least one first concave-convex part 21111 with the at least one third concave-convex part 22111 and the at least one second concave-convex part 21112 with the at least one fourth concave-convex part 22112 in two directions can be formed. In this way, the inner casing 22 can be prevented from falling off easily from the outer casing 21 when subjected to an external force in a certain direction.

As an improvement, reference is made to FIGS. 3 to 5, the accommodating hole 100 is a stepped hole, to form, on the engaging section 211, a plurality of circumferential surfaces and steps located between adjacent circumferential surfaces. The at least one first concave-convex part 21111 is formed on the plurality of circumferential surfaces and extends in a direction perpendicular to the optical axis OO', the at least one second concave-convex part 21112 is formed on the plurality of steps and extends in a direction parallel to the optical axis OO'. The inner casing 22 includes a circumferential part 221 and an end part 222, and the at least one third concave-convex part 22111 is formed on the circumferential part 21, and the at least one fourth concave-convex part 22112 is formed on the end part 222. In this way, the at least one first concave-convex part 21111 and the at least one third concave-convex part 22111 can form a fitting structure extending in the direction perpendicular to the optical axis OO', and the at least one second concave-convex part 21112 and the at least one fourth concave-convex part 22112 can form a fitting structure extending in the direction parallel to the optical axis OO', thereby the engagement stability of the inner casing 22 and the outer casing 21 can be improved.

As an improvement, reference is made to FIGS. 3 to 5, a fifth concave-convex part 223 is provided on a side of the end part 222 away from the at least one fourth concave-convex part 22112, and a sixth concave-convex part complementary to the fifth concave-convex part 223 may be provided on a lens of the corresponding lens group 10 located in the opening section 212. In this way, the engagement stability of the above-mentioned lens and the inner casing 22 can be improve, thereby the imaging effect of the lens can be improved.

As an improvement, reference is made to FIGS. 3 to 5, an inner wall of the inner casing 22 forming the mounting hole 200 is in a form of a stepped surface 2212. In this way, the provided stepped surface 2212 can improve the engagement stability of the inner casing 22 and the lens of the lens group 10 located in the mounting hole 200, so as to prevent the lens from moving relative to the inner casing 22 and affecting the imaging effect of the lens.

As an improvement, reference is made to FIGS. 3 to 5, the casing 20 further includes a locking member 23, the locking member 23 surrounds the outer casing 21, and the locking member 23 is used for abutting with the lens group 10, to fix the lens group 10 in the inner casing 22. In this way, the provided locking member 23 can prevent the lens group 10 from moving relative to the casing 20, even falling off from the casing 20. In this embodiment, the locking member 23 includes a circumferential wall 231 and an end wall 232 provided at an end of the circumferential wall 231. The end wall 232 extends from the circumferential wall 231 towards a side of the optical axis OO'. The circumferential wall 231 includes a threaded connection section on a side facing away from the opening section 212 of the outer casing 21 to enable the circumferential wall 231 to rotate relative to the outer casing 21 to compress the lens group 10 against the inner casing 22 via the end wall 232. As an improvement, the end wall 232 is arranged to surround to form a light-passing opening 300. The light-passing opening 300 communicates with the accommodating hole 100. In other embodiments, the circumferential wall 231 and the outer casing 21 may also be connected in a plug-in manner. For example, an inclined guide surface is formed between the circumferential wall 231 and the outer casing 21. By moving the circumferential wall 231 relative to the outer casing 21, the outer casing 21 is driven to change a size of a space enclosed by the opening section 212, and the outer casing 21 reacts on the circumferential wall 231 to fix the circumferential wall 231 with the outer casing 21. As an improvement, the side of the outer casing 21 away from the engagement section 211 is provided with a threaded section 213 to facilitate the connection of the lens to an external structure.

The above description merely involves embodiments of the present disclosure, and it should be noted that, for those skilled in the art, improvements may be made without departing from the inventive concept of the present disclosure, which shall also fall within the protection scope of the present disclosure.

What is claimed is:

1. A casing for mounting a lens group to for a lens, wherein the casing comprises: an outer casing made of metal material, the outer casing is provided with an accommodating hole, wherein the accommodating hole passes through the outer casing along an optical axis of the lens, and the outer casing forms a hole wall of the accommodating hole providing with a rough part; and an inner casing, wherein a hardness of the inner casing is lower than a hardness of the outer casing, the inner casing is accommodated in the accommodating hole, and the inner casing is attached to the hole wall and engaged with the rough part, and wherein the inner casing is provided with a mounting hole for mounting of the lens group, and the mounting hole passes through the inner casing along the optical axis;

wherein the hole wall comprises an engaging section and an opening section, the opening section is provided close to an object side of the lens, and the opening section is formed by fine machining, and wherein the inner casing is attached to the engaging section to expose the opening section in the accommodating hole, and the rough part is located on the engaging section, wherein the engaging section is roughened to form the rough part, and wherein the engaging section comprises a first concave-convex structure, and the inner casing comprises a second concave-convex structure complementary to the first concave-convex structure; the first concave-convex structure comprises at least one first concave-convex part and at least one second concave-convex part, an extending direction of the at least one first concave-convex part and an extending direction of the at least one second concave-convex part form an angle; the second concave-convex structure comprises at least one third concave-convex part and at least one fourth concave-convex part and wherein the accommodating hole is a stepped hole, to form, on the engaging section, a plurality of circumferential surfaces and steps located between adjacent circumferential surfaces, and wherein the at least one first concave-convex part is formed on the plurality of circumferential surfaces and extends in a direction perpendicular to the optical axis, the at least one second concave-convex part is formed on the plurality of steps and extends in a direction parallel to the optical axis, and wherein the inner casing comprises a circumferential part and an end part, and the at least one third concave-convex part is formed on the circumferential part, and the at least one fourth concave-convex part is formed on the end part.

2. The casing according to claim 1, wherein a number of the third concave-convex part is identical to a number of the first concave-convex part and the third concave-convex part corresponds to the first concave-convex part one-to-one, and a number of the fourth concave-convex part is identical to a number of the second concave-convex part and the fourth concave-convex part corresponds to the second concave-convex part one-to-one.

3. The casing according to claim 2, wherein a fifth concave-convex part is provided on a side of the end part away from the at least one fourth concave-convex part.

4. The casing according to claim 1, wherein an inner wall of the inner casing forming the mounting hole is in a form of a stepped surface.

5. The casing according to claim 1, wherein a material of the inner casing is plastic, and the inner casing is formed on the hole wall by injection molding.

6. A lens, comprising a lens group and a casing, wherein the casing comprises: an outer casing made of metal material, the outer casing is provided with an accommodating hole, wherein the accommodating hole passes through the outer casing along an optical axis of the lens, and the outer casing forms a hole wall of the accommodating hole providing with a rough part; and an inner casing, wherein a hardness of the inner casing is lower than the hardness of the outer casing, the inner casing is accommodated in the accommodating hole, and the inner casing is attached to the hole wall and engaged with the rough part, and wherein the inner casing is provided with a mounting hole for mounting of the lens group, and the mounting hole passes through the inner casing along the optical axis;

wherein the hole wall comprises an engaging section and an opening section, the opening section is provided close to an object side of the lens, and the opening section is formed by fine machining, and wherein the inner casing is attached to the engaging section to expose the opening section in the accommodating hole, and the rough part is located on the engaging section, wherein the engaging section is roughened to form the rough part, and wherein the engaging section comprises a first concave-convex structure, and the inner casing comprises a second concave-convex structure complementary to the first concave-convex structure the first concave-convex structure comprises at least one first concave-convex part and at least one second concave-convex part, an extending direction of the at least one first concave-convex part and an extending direction of the at least one second concave-convex part form an angle; the second concave-convex structure comprises at least one third concave-convex part and at least one fourth concave-convex part and wherein the accommodating hole is a stepped hole, to form, on the engaging section, a plurality of circumferential surfaces and steps located between adjacent circumferential surfaces, and wherein the at least one first concave-convex part is formed on the plurality of circumferential surfaces and extends in a direction perpendicular to the optical axis, the at least one second concave-convex part is formed on the plurality of steps and extends in a direction parallel to the optical axis, and wherein the inner casing comprises a circumferential part and an end part, and the at least one third concave-convex part is formed on the circumferential part, and the at least one fourth concave-convex part is formed on the end part; and an inner wall of the inner casing forming the mounting hole is in a form of a stepped surface, the lens group is set on the stepped surface by a fitting structure with stacked outer diameters or a bumpy ridge fitting structure is not subject to displacement movement.

7. The lens according to claim 6, wherein a number of the third concave-convex part is identical to a number of the first concave-convex part and the third concave-convex part corresponds to the first concave-convex part one-to-one, and a number of the fourth concave-convex part is identical to a number of the second concave-convex part and the fourth concave-convex part corresponds to the second concave-convex part one-to-one.

8. The lens according to claim 7, wherein a fifth concave-convex part is provided on a side of the end part away from the at least one fourth concave-convex part.

9. The lens according to claim 6, wherein a material of the inner casing is plastic, and the inner casing is formed on the hole wall by injection molding.

* * * * *